United States Patent
Nakazawa et al.

(10) Patent No.: US 9,163,131 B2
(45) Date of Patent: Oct. 20, 2015

(54) RESIN COMPOSITION CONTAINING ETHYLENE-VINYL ALCOHOL COPOLYMER

(71) Applicant: KURARAY CO., LTD., Kurashiki-shi (JP)

(72) Inventors: Shogo Nakazawa, Kurashiki (JP); Hiroshi Kawai, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/382,459

(22) PCT Filed: Mar. 27, 2013

(86) PCT No.: PCT/JP2013/059151
§ 371 (c)(1),
(2) Date: Sep. 2, 2014

(87) PCT Pub. No.: WO2013/146961
PCT Pub. Date: Oct. 3, 2013

(65) Prior Publication Data
US 2015/0105508 A1    Apr. 16, 2015

(30) Foreign Application Priority Data
Mar. 28, 2012  (JP) ................................. 2012-075227

(51) Int. Cl.
| | | |
|---|---|---|
| C08L 89/00 | (2006.01) | |
| C08K 5/13 | (2006.01) | |
| C08F 16/34 | (2006.01) | |
| C08F 18/00 | (2006.01) | |
| C08F 218/02 | (2006.01) | |
| C08K 5/07 | (2006.01) | |
| C08K 3/32 | (2006.01) | |
| C08K 3/38 | (2006.01) | |
| C08K 5/09 | (2006.01) | |
| C08L 29/04 | (2006.01) | |
| C08K 5/55 | (2006.01) | |

(52) U.S. Cl.
CPC ... *C08K 5/07* (2013.01); *C08K 3/32* (2013.01); *C08K 3/38* (2013.01); *C08K 5/09* (2013.01); *C08K 5/55* (2013.01); *C08L 29/04* (2013.01); *C08K 2003/321* (2013.01); *C08K 2003/329* (2013.01)

(58) Field of Classification Search
CPC .............. C08K 3/32; C08K 3/38; C08K 5/07; C08K 5/09; C08K 5/55; C08K 2003/329; C08K 2003/321; C08L 29/04
USPC ........................ 524/23, 76; 526/315, 320, 330
See application file for complete search history.

(56) References Cited

U.S. PATENT DOCUMENTS

| | | | |
|---|---|---|---|
| 5,744,547 A | 4/1998 | Moritani et al. | |
| 6,284,838 B1 * | 9/2001 | Silbiger | ....................... 525/54.4 |
| 6,288,165 B1 | 9/2001 | Moritani et al. | |
| 6,485,842 B1 | 11/2002 | Shindome et al. | |
| 2002/0026019 A1 | 2/2002 | Yanagida | |

FOREIGN PATENT DOCUMENTS

| | | |
|---|---|---|
| JP | 4-227744 | 8/1992 |
| JP | 4-363304 | 12/1992 |
| JP | 5-255554 | 10/1993 |
| JP | 9-71620 | 3/1997 |
| JP | 11-60874 | 3/1999 |
| JP | 11-140136 | 5/1999 |
| JP | 2001-72823 | 3/2001 |
| JP | 2001-206999 | 7/2001 |
| JP | 2001-234008 | 8/2001 |
| JP | 2002-60403 | 2/2002 |
| JP | 2004-35759 | 2/2004 |
| JP | 2004-526835 | 9/2004 |
| JP | 2007-31725 | 2/2007 |
| JP | 2009-242645 | 10/2009 |
| WO | WO 2005/014716 A1 | 2/2005 |
| WO | WO 2005/105437 | 11/2005 |

OTHER PUBLICATIONS

International Search Report issued Apr. 23, 2013, in PCT/JP13/059151 filed Mar. 27, 2013.
International Preliminary Report on Patentability issued Oct. 1, 2014 in PCT/JP2013/059152 Filed on Mar. 27, 2013.
Written Opinion issued Jul. 2, 21013 in PCT/JP2013/059152 Filed on Mar. 27, 2013 (English translation only).
U.S. Appl. No. 14/407,595, filed Dec. 12, 2014, Nakazawa, et al.
U.S. Appl. No. 14/407,136, filed Dec. 11, 2014, Nakazawa, et al.
U.S. Appl. No. 14/382,459, filed Sep. 2, 2014, Nakazawa, et al.

* cited by examiner

*Primary Examiner* — William Cheung
(74) *Attorney, Agent, or Firm* — Oblon, McClelland, Maier & Neustadt, L.L.P.

(57) ABSTRACT

The present invention provides a resin composition containing (A) an ethylene-vinyl alcohol copolymer and (B) an unsaturated aldehyde (B), in which the content of the unsaturated aldehyde (B) with respect to the resin composition containing the ethylene-vinyl alcohol copolymer is 0.01 ppm or more and 100 ppm or less. The unsaturated aldehyde (B) is preferably crotonaldehyde, 2,4-hexadienal, 2,4,6-octatrienal or a combination thereof. In addition, it is preferred that the resin composition further contains a boron compound, and the content of the boron compound is 100 ppm or more and 5,000 ppm or less. Also, it is preferred that the resin composition further contains a conjugated polyene compound, and the content of the conjugated polyene compound is 0.01 ppm or more and 1,000 ppm or less.

8 Claims, No Drawings

RESIN COMPOSITION CONTAINING ETHYLENE-VINYL ALCOHOL COPOLYMER

This is the national stage 371 application of PCT International Application No. PCT/JP2013/059151 filed Mar. 27, 2013, which claims the benefit of priority of JP 2012-075227 filed Mar. 28, 2012. The entire contents of each of the above applications are hereby incorporated by reference.

TECHNICAL FIELD

The present invention relates to a resin composition containing an ethylene-vinyl alcohol copolymer and an unsaturated aldehyde.

BACKGROUND ART

For forming containers, films, sheets and the like, melt molding is often employed, in general. Therefore, resin compositions for use in forming these containers and the like are desired to be capable of forming containers and the like that are superior in appearance characteristics without occurrences of defects such as fish eyes and streaks, and to be superior in long-run workability not accompanied by occurrences of the aforementioned defects even if melt molding is carried out for a long time period, and the like. In addition, the fish eyes and the like not only deteriorate the appearance of containers and the like, but also cause deterioration of performances; therefore, a composition capable of suppressing these occurrences is needed.

On the other hand, ethylene-vinyl alcohol copolymers (hereinafter, may be abbreviated as "EVOH(s)") are polymeric materials that are superior in barrier properties against gas such as oxygen, oil resistance, antistatic properties, mechanical strength and the like; therefore, resin compositions containing EVOH have been widely used as molding materials of containers, sheets, films and the like.

However, since EVOH has a comparatively active hydroxyl group in its molecule, an oxidation reaction and/or a crosslinking reaction is caused in a molten state at high temperatures even in the interior of an extrusion molding machine in a state being almost free from oxygen, and thus thermal deterioration products may be generated. Particularly, when a continuous operation is carried out for a long period of time, the thermal deterioration products are deposited in the molding machine to generate gels and seeds (i.e., dirt under paint) that account for fish eyes, thereby leading to a disadvantage that the resin composition containing EVOH has insufficient long-run workability.

In order to ameliorate the disadvantages described above, a variety of resin compositions containing EVOH have been developed. For example, a resin composition containing EVOH having improved long-run workability in melt molding by containing a boron compound, sodium acetate and magnesium acetate (see Japanese Unexamined Patent Application, Publication No. H11-60874), a resin composition containing EVOH that enables generation of gels and seeds by melt molding to be suppressed by containing a conjugated polyene compound (see Japanese Unexamined Patent Application, Publication No. H9-71620), a resin composition containing EVOH that is superior in thermal stability and is accompanied by suppressed formation of oxidized gels at high temperatures, due to containing a specific carboxylic acid metal salt and a hindered phenol antioxidant (see Japanese Unexamined Patent Application, Publication No. H4-227744), and the like have been developed.

However, long-run workability of these conventional resin compositions containing EVOH is not considered to be sufficient, and in a case where a metal salt is contained in the composition in a large amount, yellowing of the resulting molded articles such as containers occurs, leading to a disadvantage of being likely to have unfavorable appearances.

In addition, a production method of EVOH has been known in which crotonaldehyde is coexisted in a polymerization step of ethylene and vinyl acetate (see Japanese Unexamined Patent Application, Publication No. 2007-31725). According to this production method, an adhesion of scales in the interior of a polymerization tank can be suppressed by the coexistence of crotonaldehyde during polymerization. As a result, in regard to films of EVOH produced by this production method, generation of fish eyes resulting from the scales detached and contaminated in the polymer can be reportedly decreased.

However, in the production method, crotonaldehyde added in the polymerization is consumed in the polymerization step and a saponification step, and further washed away with water in a washing step and the like; therefore, crotonaldehyde hardly remains in a finally obtained resin composition containing EVOH since the solubility of crotonaldehyde in water is 18.1 g/100 g at 20° C. (see THE MERCK INDEX 14th 2006). Therefore, effects of the unsaturated aldehyde such as crotonaldehyde on an improvement of thermal stability and/or long-run workability in a secondary processing (melt molding, etc.) of the resultant EVOH has been unknown.

To provide a multilayered structure that is superior in the appearance through suppressing generation of gels, fish eyes and the like by improving thermal stability of EVOH has been known (see Japanese Unexamined Patent Application, Publication No. 2001-72823). However, in recent tide of environmental handling such as a reduction in amounts of packaging materials and a reduction in amounts of waste, a reduction in thicknesses of cups, bottles, films and the like has been desired, and there arises needs for additional improvements of the appearances, which have not mattered on conventional packaging materials.

PRIOR ART DOCUMENTS

Patent Documents

Patent Document 1: Japanese Unexamined Patent Application, Publication No. H11-60874
Patent Document 2: Japanese Unexamined Patent Application, Publication No. H9-71620
Patent Document 3: Japanese Unexamined Patent Application, Publication No. H4-227744
Patent Document 4: Japanese Unexamined Patent Application, Publication No. 2007-31725
Patent Document 5: Japanese Unexamined Patent Application, Publication No. 2001-72823

SUMMARY OF THE INVENTION

Problems to be Solved by the Invention

The present invention was made in view of the foregoing circumstances, and an object of the invention is to provide a resin composition being capable of forming molded articles that are superior in appearance characteristics with suppressed occurrences of defects such as fish eyes, streaks, etc., which result from melt molding, and also being superior in long-run workability even if used in melt molding in particular. Further a production method of such a resin composition is provided according to the present invention.

Means for Solving the Problems

According to an aspect of the invention made for solving the aforementioned problems, a resin composition contains (A) an ethylene-vinyl alcohol copolymer and (B) an unsaturated aldehyde, in which the content of the unsaturated aldehyde (B) with respect to the resin composition containing the ethylene-vinyl alcohol copolymer is 0.01 ppm or more and 100 ppm or less.

Due to containing the EVOH (A) and the specific amount of the unsaturated aldehyde (B), the resin composition according to the aspect of the present invention leads to suppression of occurrences of defects such as fish eyes, gels and streaks which result from melt molding; therefore, molded articles formed therefrom can be superior in appearance characteristics. In addition, even if the resin composition is subjected to melt molding for a long time period in particular, the defects are less likely to occur, and sufficient long-run workability is attained.

The unsaturated aldehyde (B) is preferably (B-1) an unsaturated aliphatic aldehyde, and more preferably at least one selected from the group consisting of crotonaldehyde, 2,4-hexadienal and 2,4,6-octatrienal.

The action of the unsaturated aldehyde (B) in suppressing the generation of the fish eyes, gels, streaks and the like which result from melt molding is not necessarily clear. However, since the unsaturated aldehyde (B) is more likely to be oxidized as compared with EVOH (A), generation of fish eyes as well as gels, streaks and the like presumed to occur through oxidative degradation of EVOH (A) by heat melting is supposed to be suppressed owing to the unsaturated aldehyde (B) more rapidly oxidized than EVOH (A).

It is preferred that a boron compound is further contained, and the content of the boron compound is 100 ppm or more and 5,000 ppm or less.

When the resin composition further contains the specific amount of the boron compound, it becomes difficult to cause gelation in melt molding, and suppression of a torque fluctuation of an extrusion molding machine or the like is enabled. Accordingly, the resin composition can form molded articles such as containers that are superior in appearance characteristics, and long-run workability can be improved. It is to be noted that the content of the boron compound herein is a value derived in terms of boric acid equivalent.

It is preferred that a conjugated polyene compound is further contained, and the content of the conjugated polyene compound is 0.01 ppm or more and 1,000 ppm or less.

When the resin composition further contains the specific amount of the conjugated polyene compound, oxidative degradation in melt molding can be suppressed. Accordingly, the resin composition can further suppress the occurrences of defects such as fish eyes, and coloring, whereby molded articles such as containers which are more superior in the appearance characteristics can be formed, and also the long-run workability can be improved.

It is preferred that the conjugated polyene compound is sorbic acid and/or a sorbic acid salt. When the resin composition contains sorbic acid and/or the sorbic acid salt as the conjugated polyene compound, oxidative degradation in melt molding can be more effectively suppressed. Accordingly, the resin composition can further suppress the occurrences of defects such as fish eyes, and coloring, thereby enabling the appearance characteristics of the molded articles formed therefrom to be improved, and more superior long-run workability is attained.

It is preferred that acetic acid and/or an acetic acid salt are/is further contained, and the content of acetic acid and/or the acetic acid salt is 50 ppm or more and 1,000 ppm or less. When the resin composition further contains the specific amount of acetic acid and/or the acetic acid salt, coloring of the molded articles formed therefrom can be prevented. It is to be noted that the content of acetic acid and/or the acetic acid salt herein is a value derived in terms of acetic acid equivalent.

It is preferred that a phosphorus compound is further contained, and the content of the phosphorus compound is 1 ppm or more and 200 ppm or less. When the resin composition further contains the specific amount of the phosphorus compound, occurrences of defects such as fish eyes, and coloring can be further suppressed, whereby the appearance characteristics of the molded articles formed therefrom can be further improved, and also still superior long-run workability can be attained. It is to be noted that the content of the phosphorus compound herein is a value derived in terms of phosphorus element equivalent.

According to another aspect of the present invention, a multilayered structure is provided which includes at least one or more layers each constituted with the resin composition. When the resin composition is used, in the case of a continuous operation for a long time period, retention and adhesion of a deteriorated resin inside/outside a die resulting from thermal deterioration can be prevented. Thus, a multilayered structure having a favorable appearance can be obtained even when a continuous operation is carried out for a long time period.

Effects of the Invention

Since the resin composition according to the aspect of the present invention enables the occurrences of defects such as fish eyes, gels and streaks in melt molding to be suppressed, molded articles such as containers and films which are superior in appearance characteristics can be formed. In addition, according to the resin composition and the multilayered structure, the defects are less likely to occur even if melt molding is carried out for a long time period in particular, and also superior long-run workability is attained. Therefore, the resin composition can be suitably used as various types of packaging materials through molding into containers, films, sheets and the like.

DESCRIPTION OF EMBODIMENTS

Hereinafter, preferred embodiments for carrying out the present invention will be explained, but the present invention is not limited thereto. Moreover, unless stated particularly, materials illustrated may be used either alone, or two or more types thereof may be used in combination.

Resin Composition

The resin composition according to an embodiment of the present invention contains (A) EVOH and (B) an unsaturated aldehyde, and the content of the unsaturated aldehyde (B) with respect to the resin composition containing the ethylene-vinyl alcohol copolymer is 0.01 ppm or more and 100 ppm or less. Furthermore, the resin composition contains a boron compound, a conjugated polyene compound, a phosphorus compound, and acetic acid and/or an acetic acid salt as suitable components. Also, the resin composition may contain other optional component(s) except for these components, within a range not leading to impairment of the effects of the present invention. The EVOH (A), the unsaturated aldehyde (B), the boron compound, the conjugated polyene compound, acetic acid and/or the acetic acid salt, the phosphorus compound, and the other optional component(s) will be described in detail below.

EVOH (A)

EVOH (A) used in the embodiment of the present invention is an ethylene-vinyl alcohol copolymer obtained by saponifying an ethylene-vinyl ester copolymer.

The EVOH (A) has an ethylene content of typically 20 mol % or more and 60 mol % or less, preferably 24 mol % or more and 55 mol % or less, more preferably 27 mol % or more and 45 mol % or less, still more preferably 27 mol % or more and 42 mol % or less, and even more preferably 27 mol % or more and 38 mol % or less. When the ethylene content is less than 20 mol %, gelation of the resin composition becomes likely to occur due to decreased thermal stability in melt extrusion, and thus defects such as streaks and fish eyes are likely to occur. In particular, when the operation is carried out for a long time period under conditions involving a higher temperature or higher speed than that in conditions for general melt extrusion, gelation of the resin composition becomes remarkable. Moreover, when the resin composition has an ethylene content of greater than mol %, gas barrier properties are impaired and intrinsic characteristics of the EVOH may not be maintained.

The degree of saponification of a vinyl ester component of the EVOH (A) is typically 85% or more, preferably 90% or more, more preferably 98% or more, and still more preferably 99% or more. When the degree of saponification of the vinyl ester component of the EVOH (A) in the resin composition is less than 85%, thermal stability may be insufficient.

A typical vinyl ester used for producing the EVOH (A) is exemplified by vinyl acetate; however, in addition thereto, other fatty acid vinyl ester such as vinyl propionate and vinyl pivalate may be used.

In addition to the ethylene and the vinyl ester, a vinylsilane compound may be further used as a copolymer component for the EVOH (A). The content of the vinylsilane compound in the EVOH (A) is 0.0002 to 0.2 mol %.

Examples of the vinylsilane compound include vinyltrimethoxysilane, vinyltriethoxysilane, vinyltri(β-methoxyethoxy) silane, γ-methacryloxypropylmethoxysilane, and the like. Of these, vinyltrimethoxysilane and vinyltriethoxysilane are preferred.

For the EVOH (A), other monomer (s) except for ethylene, vinyl esters and vinylsilane compounds may be used as a copolymer component, within a range not leading to impairment of the effects of the present invention.

Examples of the other monomer include:

unsaturated hydrocarbons such as propylene and butylene;

unsaturated carboxylic acids or esters thereof such as (meth)acrylic acid, methyl(meth)acrylate and ethyl(meth)acrylate;

vinylpyrrolidones such as N-vinylpyrrolidone, and the like.

The content of the EVOH (A) in the resin composition is typically 95% by mass or more, preferably 98.0% by mass or more, more preferably 99.0% by mass or more, and still more preferably 99.5% by mass or more. When the content of the EVOH (A) falls within the above-specified range, the molded articles obtained from the resin composition have superior barrier properties against various types of gases, oil resistance, and the like.

Unsaturated Aldehyde (B)

The resin composition according to the embodiment of the present invention contains in addition to the EVOH (A), 0.01 ppm or more and 100 ppm or less of the unsaturated aldehyde (B) as an essential component. Due to containing the specific amount of the unsaturated aldehyde (B), the resin composition can suppress the occurrences of defects such as fish eyes, gels and streaks which result from melt molding; therefore, the molded articles formed therefrom can be superior in appearance characteristics. In addition, even if the resin composition is subjected to melt molding for a long time period in particular, the defects are less likely to occur, and thus superior long-run workability is attained. In addition, as a consequence of containing such an unsaturated aldehyde (B), the amount of other components such as the conjugated polyene compound added for the purpose of achieving similar effects can be decreased, and superior long-run workability can be attained in an entirely small amount of addition.

The unsaturated aldehyde (B) is an aldehyde having a carbon-carbon double bond or triple bond in its molecule, and is preferably an unsaturated aliphatic aldehyde (B-1) and more preferably at least one selected from the group consisting of crotonaldehyde, 2,4-hexadienal and 2,4,6-octatrienal.

The content of the unsaturated aldehyde (B) with respect to the resin composition is 0.01 ppm or more and 100 ppm or less, preferably 0.05 ppm or more and 50 ppm or less, more preferably 0.1 ppm or more and 30 ppm or less, and still more preferably 0.2 ppm or more and 5 ppm or less. When the content of the unsaturated aldehyde (B) in the resin composition is less than 0.01 ppm, long-run workability in melt molding may be insufficient, and occurrences of defects such as fish eyes, gels and streaks over time cannot be suppressed. In addition, when the content of the unsaturated aldehyde (B) is greater than 100 ppm, a crosslinking effect is exhibited in melt molding through condensation of the unsaturated aldehyde (B) as well as a reaction between the EVOH (A) and a condensate of the unsaturated aldehyde (B), thereby leading to an increase in the viscosity or gelation such that occurrences of defects such as gels, seeds and streaks may be caused, and coloring of the resin composition becomes more likely to occur. The content of the unsaturated aldehyde (B) in the resin composition as referred to herein is represented by a proportion with respect to the total mass of the solid content of the resin composition, and specifically, is a value obtained by a quantitative determination of the unsaturated aldehyde (B) contained in the resin composition dried.

The unsaturated aldehyde (B) is preferably (B-1) an unsaturated aliphatic aldehyde, more preferably an aldehyde having a carbon-carbon double bond in its molecule such as acrylaldehyde (acrolein), crotonaldehyde, methacrylaldehyde, 2-methyl-2-butenal, 2-butynal, 2-hexenal, 2,6-nonadienal, 2,4-hexadienal, 2,4,6-octatrienal, 2-hexenal and 5-methyl-2-hexenal, as well as an aldehyde having a carbon-carbon triple bond such as propiolaldehyde, 2-butyn-1-al and 2-pentyn-1-al, still more preferably a linear or branched unsaturated aliphatic aldehyde having a carbon-carbon double bond, even more preferably at least one selected from the group consisting of crotonaldehyde, 2,4-hexadienal and 2,4,6-octatrienal. In particular, crotonaldehyde having a boiling point of about 100° C. and having a high solubility in water is further preferred because of ease in eliminating an excess, or adding a shortage as needed in a washing step and/or a drying step, for example. The unsaturated aldehyde (B) has preferably 3 to 10 carbon atoms, more preferably 4 to 8 carbon atoms, and still more preferably 4, 6 or 8 carbon atoms, including aldehyde moieties.

Boron Compound

It is preferred that the resin composition further contains 100 ppm or more and 5,000 ppm or less of a boron compound. When the resin composition contains the boron compound in the specific amount, gelation is less likely to occur in melt molding, and a torque fluctuation of an extrusion molding machine and the like can be suppressed. Accordingly, the resin composition can form a container and the like being superior in appearance characteristics, and the long-run workability can be improved. It is to be noted that the content of the boron compound is a value derived in terms of boric acid equivalent.

Examples of the boron compound include:

boric acids such as orthoboric acid, metaboric acid and tetraboric acid;

boric acid esters such as triethyl borate and trimethyl borate;

boric acid salts such as alkali metal salts or alkaline earth metal salts of the aforementioned boric acids, and borax;

boron hydrides, and the like. Of these, boric acids are preferred, and orthoboric acid (hereinafter, may be also merely referred to as "boric acid") is more preferred.

The content of the boron compound is 100 ppm or more and 5,000 ppm or less, preferably 100 ppm or more and 4,000 ppm or less, and more preferably 150 ppm or more and 3,000 ppm or less. When the resin composition has the content of the boron compound falling within the above-specified range, a torque fluctuation of an extrusion molding machine and the like in heat melting can be effectively suppressed. When the content of the boron compound of the resin composition is less than 100 ppm, the effects cannot be sufficiently exhibited, whereas when the content is greater than 5,000 ppm, appearance characteristics of the molded articles formed therefrom may be insufficient since gelation is likely to occur.

Conjugated Polyene Compound

It is preferred that the resin composition further contains 0.01 ppm or more and 1,000 ppm or less of a conjugated polyene compound. When the resin composition further contains the specific amount of the conjugated polyene compound, oxidative degradation in melt molding can be suppressed. Accordingly, the resin composition further suppresses occurrences of defects such as fish eyes, and coloring, leading to an improvement of the appearance characteristics of the molded articles formed therefrom, and also further superior long-run workability is achieved.

The conjugated polyene compound as referred to means a compound having a conjugated double bond, as generally referred to, i.e., a compound: having a structure formed by alternately linking a carbon-carbon double bond and a carbon-carbon single bond; and having two or more carbon-carbon double bonds. The conjugated polyene compound may be a conjugated diene having two double bonds, a conjugated triene having three double bonds, or a conjugated polyene having more than three conjugated double bonds. In addition, the conjugated double bond may be present in a multiple number in a single molecule without being conjugated one another. For example, compounds having three conjugated triene structures in the same molecule, such as tung oil, may be also included in the conjugated polyene compound.

The conjugated polyene compound preferably has 7 or less conjugated double bonds. When the resin composition contains a conjugated polyene compound having 8 or more conjugated double bonds, coloring of the molded articles formed therefrom is likely to occur.

The conjugated polyene compound may have in addition to the conjugated double bond, other functional group such as a carboxyl group and a salt thereof, a hydroxyl group, an ester group, a carbonyl group, an ether group, an amino group, an imino group, an amide group, a cyano group, a diazo group, a nitro group, a sulfone group and a salt thereof, a sulfonyl group, a sulfoxide group, a sulfide group, a thiol group, a phosphoric acid group and a salt thereof, a phenyl group, a halogen atom, a double bond, and a triple bond.

Examples of the conjugated polyene compound include:

conjugated diene compounds such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-phenyl-1,3-butadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, ocimene, phellandrene, myrcene, farnesene, cembrene, sorbic acid, sorbic acid esters, sorbic acid salts and abietic acid;

conjugated triene compounds such as 1,3,5-hexatriene, 2,4,6-octatriene-1-carboxylic acid, eleostearic acid, tung oil, cholecalciferol, fulvene and tropone;

conjugated polyene compounds such as cyclooctatetraene, 2,4,6,8-decatetraene-1-carboxylic acid, retinol and retinoic acid; and the like. The aforementioned conjugated polyene compound may be used alone, or two or more types thereof be used in combination.

The conjugated polyene compound has preferably 4 to 30 carbon atoms, and more preferably 4 to 10 carbon atoms.

Among these, sorbic acid, a sorbic acid ester, a sorbic acid salt, myrcene and an arbitrary mixture of these are preferred, and sorbic acid, a sorbic acid salt and a mixture of these are more preferred. Sorbic acid, a sorbic acid salt and a mixture of these exhibit superior suppressive effects on oxidative degradation at high temperatures, and are preferred also in light of hygienic properties and availability since they are industrially used broadly also as food additives.

The molecular weight of the conjugated polyene compound is typically 1,000 or less, preferably 500 or less, and more preferably 300 or less. When the molecular weight of the conjugated polyene compound is greater than 1,000, the state of dispersion in EVOH (A) may be inferior, and thus the appearance after the melt molding may be unfavorable.

The content of the conjugated polyene compound is 0.01 ppm or more and 1,000 ppm or less, preferably 0.1 ppm or more and 1,000 ppm or less, more preferably 0.5 ppm or more and 800 ppm or less, and still more preferably 1 ppm or more and 500 ppm or less. When the content of the conjugated polyene compound in the resin composition is less than 0.01 ppm, the effect of suppressing oxidative degradation in melt molding may not be satisfactorily achieved. On the other hand, when the content is greater than 1,000 ppm, gelation of the resin composition is accelerated, and thus the appearance of the molded articles formed therefrom is likely to be unfavorable.

Japanese Unexamined Patent Application, Publication No. H9-71620 discloses that a resin composition accompanied by less generation of gelatinous seeds in molding can be obtained by adding a conjugated polyene compound in a step after the polymerization. However, according to the present invention, it was newly found that by further adding the unsaturated aldehyde (B) in addition to the conjugated polyene compound, occurrences of defects such as fish eyes, and coloring can be further suppressed, whereby the appearance characteristics of the molded articles formed therefrom can be improved, and additionally, the resin composition that is superior also in long-run workability can be obtained.

Acetic Acid and/or Acetic Acid Salt

The resin composition preferably contains 50 ppm or more and 1,000 ppm or less of acetic acid and/or an acetic acid salt (i.e., acetic acid, an acetic acid salt or a combination thereof). When the resin composition further contains the specific amount of acetic acid and/or the acetic acid salt, coloring of the molded articles formed therefrom can be prevented. It is to be noted that the content of acetic acid and/or the acetic acid salt is a value derived in terms of acetic acid equivalent.

As acetic acid and/or the acetic acid salt, both acetic acid and the acetic acid salt are preferably used, and acetic acid and sodium acetate are more preferably used.

The content of acetic acid and/or the acetic acid salt is preferably 50 ppm or more and 1,000 ppm or less, more preferably 100 ppm or more and 1,000 ppm or less, still more preferably 150 ppm or more and 500 ppm or less, and particularly preferably 200 ppm or more and 400 ppm or less. When the content of acetic acid and/or the acetic acid salt is less than 50 ppm, a sufficient preventive effect on coloring cannot be achieved; therefore, yellowing of the molded articles formed from the resin composition may be found. When the content of acetic acid and/or the acetic acid salt in the resin composition is greater than 1,000 ppm, gelation is likely to occur in melt molding, particularly in melt molding over a long time period, and thus the appearance of the molded articles may be unfavorable.

Phosphorus Compound

The resin composition preferably contains 1 ppm or more and 200 ppm or less of a phosphorus compound. When the resin composition further contains the specific amount of the phosphorus compound, occurrences of defects such as fish eyes, and coloring can be further suppressed, and thus the appearance characteristics of the molded articles formed therefrom can be improved, with further superior long-run workability attained. It is to be noted that the content of the phosphorus compound is a value derived in terms of phosphorus element equivalent.

Examples of the phosphorus compound include various types of phosphoric acids such as phosphoric acid and phosphorous acid, phosphate, and the like.

The phosphate may be in any form of a monobasic phosphate salt, a dibasic phosphate salt and a tribasic phosphate salt. In addition, the cationic species contained in the phosphate is not particularly limited, and an alkali metal salt, and an alkaline earth metal salt are preferred. Of these, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are even more preferred.

The content of the phosphorus compound in the resin composition is preferably 1 ppm or more and 200 ppm or less, more preferably 2 ppm or more and 150 ppm or less, still more preferably 3 ppm or more and 150 ppm or less, and particularly preferably 5 ppm or more and 100 ppm or less. When the content of the phosphorus compound in the resin composition is less than 1 ppm, or is greater than 200 ppm, thermal stability is deteriorated, and thus disadvantages of generation of gelatinous seeds, and coloring in the melt molding over a long time period are likely to be caused.

Other Optional Components

The resin composition may contain an alkali metal as other optional component, within a range not leading to impairment of the effects of the present invention. Examples of the alkali metal include lithium, sodium, potassium and the like. Moreover, the alkali metal may be contained in the form of an alkali metal salt. Examples of the alkali metal salt include aliphatic carboxylic acid salts and aromatic carboxylic acid salts with a monovalent metal, metal complexes, and the like. Specific examples of the alkali metal salt include sodium acetate, potassium acetate, sodium stearate, potassium stearate, sodium salts of ethylenediamine tetraacetate, and the like. Of these, sodium acetate and potassium acetate are preferred. The content of the alkali metal in the resin composition is preferably 20 to 1,000 ppm, and more preferably 50 to 500 ppm.

The resin composition may contain an antioxidant, an UV absorbent, a plasticizer, an antistatic agent, a lubricant, a colorant, a filler, a heat stabilizer, an other resin, a metal salt of a higher aliphatic carboxylic acid, a hydrotalcite compound and the like as other optional components, as well as the aforementioned alkali metal. The resin composition may contain one, or two or more types of these optional components, and the content of the optional component(s) is 1% by mass or less in total.

Examples of the antioxidant include 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl 3-(3',5'-di-t-butyl-4'-hydroxyphenyl)propionate, 4,4'-thiobis-(6-t-butylphenol), and the like.

Examples of the UV absorbent include ethylene 2-cyano-3,3'-diphenylacrylate, 2-(2'-hydroxy-5'-methylphenyl)benzotriazole, 2-(2'-hydroxy-5'-methylphenyl)benzotriazole, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone.

Examples of the plasticizer include dimethyl phthalate, diethyl phthalate, dioctyl phthalate, waxes, liquid paraffins, phosphoric acid esters, and the like.

Examples of the antistatic agent include pentaerythritol monostearate, sorbitan monopalmitate, sulfated polyolefins, polyethylene oxides, CARBOWAX (trade name), and the like.

Examples of the lubricant include ethylene bisstearamide, butyl stearate, and the like.

Examples of the colorant include carbon black, phthalocyanine, quinacridone, indoline, azo pigment, colcothar, and the like.

Examples of the filler include glass fibers, wollastonite, calcium silicate, talc, montmorillonite, and the like.

Examples of the heat stabilizer include hindered phenol compounds, hindered amine compounds, and the like.

Examples of the other resin include polyamides, polyolefins, and the like.

Examples of the metal salt of a higher aliphatic carboxylic acid include calcium stearate, magnesium stearate, and the like.

In order to prevent generation of gels, one, or two or more types of the hydrotalcite compound, the hindered phenol heat stabilizer, the hindered amine heat stabilizer and the metal salt of a higher aliphatic carboxylic acid may be added in an amount of 0.01 to 1% by mass.

Production Method of Resin Composition

The production method of the resin composition according to the embodiment of the present invention is not particularly limited as long as the unsaturated aldehyde (B) can be homogenously blended in EVOH (A), and the unsaturated aldehyde (B) in an amount falling within the range of 0.01 ppm or more and 100 ppm or less can be contained in the resin composition finally obtained.

However, the production method according to the embodiment of the present invention is preferably a production method of a resin composition containing the ethylene-vinyl alcohol copolymer including the steps of:

(1) copolymerizing ethylene with a vinyl ester; and (2) saponifying a polymer obtained in the step (1), in which 0.01 ppm or more and 100 ppm or less of the unsaturated aldehyde (B) is contained in the resin composition.

The procedure for allowing the specific amount of the unsaturated aldehyde (B) to be contained in the resin composition is not particularly limited, but the procedure may be exemplified by:

adding the specific amount of the unsaturated aldehyde (B) in the step (1);

adding the specific amount of the unsaturated aldehyde (B) in the step (2);

adding the specific amount of the unsaturated aldehyde (B) to the EVOH (A) obtained in the step (2), and the like.

However, when the procedure of adding the specific amount of the unsaturated aldehyde (B) in the step (1), or the procedure of adding the specific amount of the unsaturated aldehyde (B) in the step (2) is employed, in order to allow a desired amount of the unsaturated aldehyde (B) to be contained in the resulting resin composition, it is necessary to increase the amount of addition taking into consideration the amount consumed by a polymerization reaction in the step (1) and/or by a saponification reaction in the step (2). Whereas, in the case in which the amount of the unsaturated aldehyde (B) is too large, these reactions may be inhibited. In addition, since the amount consumed by the polymerization reaction and/or the saponification reaction may vary depending on the reaction conditions, it would be difficult to regulate the content of the unsaturated aldehyde (B) in the resin composition. Therefore, the procedure of adding, after the step (2), the specific amount of the unsaturated aldehyde (B) to the EVOH (A) obtained in the step (2) is preferred.

The procedure for adding the specific amount of the unsaturated aldehyde (B) to the EVOH (A) may be exemplified by:

pelletizing after blending the unsaturated aldehyde (B) with EVOH (A) beforehand to give pellets;

impregnating a strand obtained by deposition of a paste after saponification of the ethylene-vinyl ester copolymer with the unsaturated aldehyde (B);

impregnating the strand obtained by deposition after cutting, with the unsaturated aldehyde (B);

adding the unsaturated aldehyde (B) to a solution of redissolved chips of a dry resin composition;

melt kneading a blend of two components of the EVOH (A) and the unsaturated aldehyde (B);

feeding the unsaturated aldehyde (B) to be contained in a melt of the EVOH (A) during extrusion;

producing a masterbatch by blending a high concentration of the unsaturated aldehyde (B) with a part of the EVOH (A) and pelletizing the blend, and dry blending the masterbatch with the EVOH (A) and the melt kneading the mixture; or the like.

Of these, in light of a possibility of homogenously dispersing a slight amount of the unsaturated aldehyde (B) in the EVOH (A), pelletizing after blending the unsaturated aldehyde (B) with EVOH (A) beforehand to give pellets is preferred for the procedure of mixing the unsaturated aldehyde (B). Specifically, the unsaturated aldehyde (B) is added to a solution prepared by dissolving the EVOH (A) in a good solvent such as a mixed solvent of water and methanol, and thus resulting mixture solution is extruded into a poor solvent through a nozzle or the like to allow for deposition and/or coagulation, followed by washing and/or drying the same, whereby the pellets including the unsaturated aldehyde (B) homogenously mixed with the EVOH (A) can be obtained.

Also, in pelletizing to give the pellets, the conjugated polyene compound may be added together with the unsaturated aldehyde (B). By adding the unsaturated aldehyde (B) and the conjugated polyene compound, the occurrences of defects such as fish eyes, and coloring can be further suppressed, and thus the appearance characteristics of the molded articles formed therefrom can be improved. In addition, the resin composition that is also superior in long-run workability can be obtained.

The procedure for allowing each component other than the unsaturated aldehyde (B) to be contained in the resin composition may be exemplified by:

mixing the pellets with each component, followed by melt kneading;

mixing each component together with the unsaturated aldehyde (B) in preparing the pellets;

immersing the pellets in a solution containing each component; and the like. Note that a ribbon blender, a high speed mixer, a coknader, a mixing roll, an extruder, an intensive mixer and the like may be employed for the mixing.

Production Method of Molded Article

The resin composition may be used to produce molded articles having a single-layer structure, or together with any of other various types of base materials, molded articles having a multilayer structure including two or more types of layers.

When a molded article having a multilayer structure is produced, a thermoplastic resin layer may be situated adjacent to a layer constituted with the resin composition.

Examples of preferred resins for forming the thermoplastic resin layer include:

polyethylenes having a high density, medium density or low density;

polyethylenes prepared by copolymerizing vinyl acetate, an acrylic acid ester, or an α-olefin such as butene or hexene with ethylene;

ionomer resins;

polypropylene homopolymers;

polypropylenes prepared by copolymerizing an α-olefin such as ethylene, butene or hexane with propylene;

polyolefins such as modified polypropylene to which a rubber polymer was blended;

resins obtained by addition or grafting of maleic anhydride to these resins.

The molded article of the multilayer structure may further have a thermoplastic resin layer other than those described above, and the resin for forming the thermoplastic resin layer is preferably a polyamide resin, a polyester resin, a polystyrene resin, a polyvinyl chloride resin, an acrylic resin, a polyurethane resin, a polycarbonate resin, a polyvinyl acetate resin, and the like. Of these, a polyester resin is preferred.

Although a method for obtaining the multilayered structure is not particularly limited, examples of the method include an extrusion lamination method, a dry lamination method, an extrusion blow molding method, a coextrusion lamination method, a coextrusion sheet molding method, a coextrusion pipe molding method, a coextrusion blow molding method, a coinjection molding method, a solution coating method, and the like. It is to be noted that the laminate having a multilayer structure obtained by such a method may be further subjected to a secondary processing by a method such as deep-draw vacuum molding or blow molding after reheating at a temperature falling within the range of not exceeding the melting point of the EVOH (A).

Note that scraps generated in carrying out the extrusion molding, blow molding, heat molding and the like may be reused through blending in the thermoplastic resin layer, or may be separately used as a recovery layer.

Although the layer structure of the multilayered structure is not particularly limited, in light of moldability, cost and the like, examples of a typical layer structure include those having layers of: a thermoplastic resin/the resin composition/a thermoplastic resin; the resin composition/an adhesive resin/a thermoplastic resin; and a thermoplastic resin/an adhesive resin/the resin composition/an adhesive resin/a thermoplastic resin in these orders. Of these, the layer structure having layers of a thermoplastic resin/the resin composition/a thermoplastic resin in this order is preferred. More specifically, the layer structure having layers constituted with a thermoplastic polyester resin directly laminated on two sides of the layer constituted with the resin composition, respectively, is more preferred. In the case in which the thermoplastic resin layers are provided on two outer sides of the resin composition layer, respectively, the thermoplastic resin layers provided as two outer layers may be constituted with resins different from each other, or may be constituted with an identical resin.

The multilayered structure obtained by the melt molding and the like may be subjected to secondary processing molding such as bending processing, vacuum molding, blow molding and press molding as needed, to give a molded product as intended.

EXAMPLES

Hereinafter, the present invention is specifically explained by way of Examples, but the present invention is not in anyhow limited to these Examples. It is to be noted that each quantitative determination in these Examples was carried out using the following method.

Ethylene Content and Degree of Saponification of EVOH (A)

A $^1$H-NMR spectrometer (manufactured by JEOL, Ltd., "model JNM-GX-500") was employed for the determination using DMSO-$d_6$ as a solvent.

Quantitative Determination of Unsaturated Aldehyde (B)

A DNPH (2,4-dinitrophenylhydrazine) preparation was prepared by adding 50 mL of 1,1,1,3,3,3-hexafluoroisopropanol (HFIP), 11.5 mL of acetic acid and 8 mL of ion exchanged water to 200 mg of a 50% by mass DNPH solution. Thereafter, dry resin composition pellets in an amount of 1 g were added to 20 mL of the DNPH preparation, and dissolved with stirring at 35° C. for 1 hour. To this solution was added acetonitrile to permit precipitation of the EVOH (A), and the resulting solution was filtered and concentrated to obtain an extracted sample. This extracted sample was analyzed for a quantitative determination on high performance liquid chromatography. Thus, the amount of the unsaturated aldehyde (B) was quantitatively determined. It is to be noted that upon the quantitative determination, a calibration curve produced using an authentic sample obtained by allowing each unsaturated aldehyde (B) to react with the DNPH preparation was used.

Quantitative Determination of Conjugated Polyene Compound

The dry resin composition pellets were ground by freeze grinding, and 10 g of a ground matter obtained by eliminating coarse particles using a sieve having a nominal dimension of 0.150 mm (100 mesh, in accordance with JIS Z8801-1 to 3) was packed into a Soxhlet extraction apparatus to execute an extraction treatment using 100 mL of chloroform for 48 hrs. The amount of the conjugated polyene compound in this extraction liquid was analyzed for a quantitative determination on high performance liquid chromatography. Thus, the amount of the conjugated polyene compound was quantitatively determined. It is to be noted that upon the quantitative determination, a calibration curve produced using an authentic sample of each conjugated polyene compound was used.

Quantitative Determination of Acetic Acid and/or Acetic Acid Salt

The dry resin composition pellets were ground by freeze grinding. Thus obtained powders were sieved using a sieve having a nominal dimension of 1 mm (16 mesh, in accordance with JIS Z8801-1 to 3). Ten grams of the powders passed through the sieve and 50 mL of ion exchanged water were charged into a 100 mL Erlenmeyer stoppered flask equipped with a cooling condenser, and the mixture was stirred at 95° C. for 10 hrs and extracted. Thus resultant extraction liquid in a volume of 2 mL was diluted with 8 mL of ion exchanged water. The amount of carboxylic acid ions in the extraction liquid diluted as described above was quantitatively determined using ion chromatography ("IC7000", manufactured by Yokogawa Electric Corporation). It is to be noted that upon the quantitative determination, a calibration curve produced using an aqueous acetic acid solution was used.

Quantitative Determination of Phosphoric Acid Compound and Boron Compound

The dry resin composition pellets were ground by freeze grinding. To 0.5 g of thus obtained powders was added 5 mL of nitric acid, and subjected to wet degradation by Speedwave MWS-2 (manufactured by BERGHOF Co.). The liquid obtained after the wet degradation was diluted with ion exchanged water to give a total liquid volume of 50 mL. The liquid diluted was analyzed for quantitative determinations of a phosphorus element and a boron element using an ICP emission spectrophotometer ("Optima 4300 DV", manufactured by Perkin-Elmer Japan Co., Ltd.). The amount of the phosphoric acid compound was calculated as a value derived in terms of phosphate radical equivalent, whereas the amount of the boron compound was calculated as a value derived in terms of boron element equivalent. It is to be noted that upon the quantitative determination, a calibration curve produced using each commercially available standard liquid was used.

Appearance of Solution (Transparency, Coloring Property)

The dry resin composition pellets were subjected to a heat treatment in the air at 120° C. for 15 hrs, and 10 g of the resultant pellets were weighed into a 300 ml Erlenmeyer flask. Thereto was added 100 ml of a mixed solution of water and propanol (mass ratio: water/propanol=45/55), and the mixture was stirred at 75° C. for 3 hrs. Then, transparency and coloring of the solution were evaluated by a visual inspection.

Motor Torque Fluctuation

The dry resin composition pellets in an amount of 60 g were kneaded in a Laboplast Mill (manufactured by Toyo Seiki Seisaku-sho, Ltd., "20R200", twin-screw, counter rotating type) at 100 rpm and 260° C., and a time period was determined which was required until the torque value reached 1.5 times the torque value after 5 min from the beginning of the kneading.

Synthesis of EVOH (A)

Synthesis Example 1

Using a 250 L pressure reaction chamber, polymerization for an ethylene-vinyl acetate copolymer was carried out under the following conditions.

vinyl acetate: 83.0 kg,
methanol: 26.6 kg,
feeding rate of 2,2'-azobisisobutylnitrile: 1,119.5 mL/hour,
polymerization temperature: 60° C.,
pressure of ethylene in polymerization chamber: 4.93 MPa,
polymerization time period: 5.0 hrs The rate of polymerization of vinyl acetate in the resultant copolymer was about 40%. After sorbic acid was added to this copolymerization reaction liquid, the liquid was supplied to a purge tower, and after unreacted vinyl acetate was eliminated from the top of the tower by introducing methanol vapor from the bottom of the tower, a 41% methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester component in the copolymer. Thereto was added methanol to adjust the copolymer concentration of 20%. The temperature of this solution was elevated to 60° C., and the reaction was allowed while blowing nitrogen gas into the reactor for about 4 hrs. This solution was then extruded from a die plate provided with a circular opening into water to permit deposition, followed by cutting to give pellets having a diameter of about 3 mm and a length of about 5 mm. The pellets thus obtained were subjected to deliquoring using a centrifugal separator, and further an operation of the deliquoring after adding a large amount of water was repeated.

Synthesis Example 2

Pellets were obtained by polymerizing, saponifying, pelletizing and washing in a similar manner to Synthesis Example 1 except that crotonaldehyde was supplied so as to coexist at 0.5 ppm in the whole system during the polymerization.

Preparation of Resin Composition

Examples 1 to 17, 19 to 27 and Comparative Examples 1 to 2, 4 to 7

Twenty kg of the pellets obtained after deliquoring in Synthesis Example 1 were placed into 180 kg of a mixed solvent of water and methanol (mass ratio: water/methanol=40/60), and the mixture was stirred at 60° C. for 6 hrs to completely dissolve the pellets. To the solution thus obtained were added the unsaturated aldehyde (B) and the conjugated polyene compound, and the mixture was further stirred for 1 hour such that the unsaturated aldehyde (B) and the conjugated polyene compound were completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. thereby permitting coagulation so as to give a strand form. This strand was introduced into a pelletizing machine to obtain porous resin composition chips. After the resultant porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hrs and further at 100° C. for 16 hrs to obtain a resin composition (dry resin composition pellets). The content of each component in the obtained resin composition was quantitatively determined using the aforementioned quantitative determination methods. It is to be noted that the resin composition was prepared such that the content of each component was as shown in Tables 1 and 2 by adjusting the amount of the unsaturated aldehyde (B) added, and the concentration of each component in the aqueous solution for the immersion treatment.

Example 18

Pellets were obtained in a similar manner to Synthesis Example 1 except that sorbic acid and crotonaldehyde were concomitantly added after completion of the polymerization. Twenty kg of the resulting pellets were placed into 180 kg of a mixed solvent of water and methanol (mass ratio: water/methanol=40/60), and the mixture was stirred at 60° C. for 6 hrs to completely dissolve the pellets. To the solution thus obtained was added sorbic acid as the conjugated polyene compound, and the mixture was further stirred for 1 hour such that sorbic acid is completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. thereby permitting coagulation so as to give a strand form. This strand was introduced into a pelletizing machine to obtain porous resin composition chips. After the resultant porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hrs and further at 100° C. for 16 hrs to obtain a resin composition (dry resin composition pellets). The content of each component in the obtained resin composition was quantitatively determined using the aforementioned quantitative determination methods. It is to be noted that the resin composition was prepared such that the content of each component was as shown in Tables 1 and 2 by adjusting the concentration of each component in the aqueous solution for the immersion treatment.

Comparative Example 3

Twenty kg of the pellets obtained in Synthesis Example 2 were placed into 180 kg of a mixed solvent of water and methanol (mass ratio: water/methanol=40/60), and the mixture was stirred at 60° C. for 6 hrs to completely dissolve the pellets. To the solution thus obtained was added sorbic acid as the conjugated polyene compound, and the mixture was further stirred for 1 hour such that sorbic acid is completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. thereby permitting coagulation so as to give a strand form. This strand was introduced into a pelletizing machine to obtain porous resin composition chips. After the resultant porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hrs and further at 100° C. for 16 hrs to obtain a resin composition (dry resin composition pellets). The content of each component in the obtained resin composition was quantitatively determined using the aforementioned quantitative determination methods. It is to be noted that the resin composition was prepared such that the content of each component was as shown in Tables 1 and 2 by adjusting the concentration of each component in the aqueous solution for the immersion treatment. The amount of crotonaldehyde added as the unsaturated aldehyde (B) was less than the detection lower limit.

Evaluations of Resin Composition

Each resin composition obtained in the above manner was evaluated as in the following. The results of the evaluations are shown together in Tables 1 and 2.

(1) Evaluation of Long-Run Workability

Using a single-screw extruder ("D2020", manufactured by Toyo Seiki Seisaku-sho, Ltd.; D (mm)=20, L/D=20, compression ratio=2.0, screw: full flight), a single-layer film having a thickness of 20 μm was produced from each dry resin composition pellets. In this procedure, each condition is as shown below.

extrusion temperature: 220° C.
    screw rotation speed: 40 rpm
    die width: 30 cm
    roll drawing temperature: 80° C.
    roll drawing speed: 3.1 m/min A single-layer film was produced by a continuous operation under the conditions described above, and the number of defects of each produced film after 8 hrs and 15 hrs from the start of the operation was counted over the length of 17 cm of the film. The number of the defects was counted using an apparatus for inspecting film defects ("AI-10", manufactured by Frontier System Co., Ltd.). It is to be noted that a camera for detection in the apparatus was placed such that the lens thereof was situated with a distance of 195 mm away from the film surface. The long-run workability of each resin composition was evaluated based on the number of the defects to be:

"favorable (A)" when the number was less than 50;
    "somewhat favorable (B)" when the number was 50 or more and less than 200; and
    "unfavorable (C)" when the number was 200 or more.

(2) Evaluation of Appearance Characteristics

With respect to the produced film after 15 hrs, appearance characteristics (streaks and coloring) were evaluated by a visual inspection in accordance with the following evaluation criteria.

Evaluation Criteria of Streaks
    "favorable (A)": no streaks found.
    "somewhat favorable (B)": streaks found.
    "unfavorable" (C)": a large number of streaks found.

Evaluation Criteria of Coloring
    "favorable (A)": colorless
    "somewhat favorable (B)": yellowed
    "unfavorable" (C)": significantly yellowed (3) Evaluation of Appearance of Solution (Transparency and Coloring)

With respect to the solution heated with stirring for 3 hrs, transparency and coloring of the solution were evaluated by a visual inspection in accordance with the following evaluation criteria.

Evaluation Criteria of Transparency
    "favorable (A)": transparent, suspended matter recognizable by the visual inspection being absent.
    "somewhat favorable (B)": somewhat turbid, suspended matter recognizable by the visual inspection being present.
    "unfavorable" (C)": turbid, suspended matter being present.

Evaluation Criteria of Coloring of Solution
    "favorable (A)": colorless
    "somewhat favorable (B)": somewhat colored
    "poor, unfavorable" (C)": significantly colored (4) Evaluation of Motor Torque Fluctuation Alteration of the viscosity when heated was evaluated as follows. It is to be noted that the viscosity of the resin composition when heated is a factor that affects the long-run workability in secondary processing.

Evaluation Criteria of Motor Torque Fluctuation
    "favorable (A)": 60 min or more
    "somewhat favorable (B)": 40 min or more and less than 60 min
    "unfavorable" (C)": less than 40 min

TABLE 1

| | Unsaturated aldehyde (B) | | Boron compound | | Conjugated polyene compound | | Acetic acid/acetic acid salt | | Phosphorus compound | | Evaluations | | | | | | |
|---|---|---|---|---|---|---|---|---|---|---|---|---|---|---|---|---|---|
| | | | | | | | | | | | Long-run workability | | Film appearance | | Appearance of solution | | Motor torque fluctuation |
| | type | content (ppm) | type | content (ppm) | type | content (ppm) | type | content (ppm) | type | content (ppm) | after 8 hrs | after 15 hrs | streak | coloring | transparency | coloring | |
| Example 1 | crotonaldehyde | 35 | boric acid | 800 | sorbic acid | 200 | acetic acid sodium acetate | 300 | potassium dihydrogen phosphate | 120 | A | B | A | B | A | B | A |
| Example 2 | crotonaldehyde | 2.9 | boric acid | 800 | sorbic acid | 200 | acetic acid sodium acetate | 300 | potassium dihydrogen phosphate | 120 | A | A | A | A | A | A | A |
| Example 3 | crotonaldehyde | 0.3 | boric acid | 800 | sorbic acid | 200 | acetic acid sodium acetate | 300 | potassium dihydrogen phosphate | 120 | A | A | A | A | A | A | A |
| Example 4 | crotonaldehyde | 0.3 | boric acid | 10 | sorbic acid | 200 | acetic acid sodium acetate | 300 | potassium dihydrogen phosphate | 120 | A | B | B | A | A | A | A |
| Example 5 | crotonaldehyde | 0.3 | boric acid | 200 | sorbic acid | 200 | acetic acid sodium acetate | 300 | potassium dihydrogen phosphate | 120 | A | A | A | A | A | A | A |
| Example 6 | crotonaldehyde | 0.3 | boric acid | 2500 | sorbic acid | 200 | acetic acid sodium acetate | 300 | potassium dihydrogen phosphate | 120 | A | A | A | A | A | A | B |
| Example 7 | crotonaldehyde | 0.3 | boric acid | 4000 | sorbic acid | 200 | acetic acid sodium acetate | 300 | potassium dihydrogen phosphate | 120 | B | B | B | A | A | A | B |
| Example 8 | crotonaldehyde | 0.3 | boric acid | 800 | sorbic acid | 0.01 | acetic acid sodium acetate | 300 | potassium dihydrogen phosphate | 120 | A | B | A | B | A | B | B |
| Example 9 | crotonaldehyde | 0.3 | boric acid | 800 | sorbic acid | 2000 | acetic acid sodium acetate | 300 | potassium dihydrogen phosphate | 120 | B | B | B | A | A | B | B |
| Example 10 | crotonaldehyde | 0.3 | boric acid | 800 | myrcene | 200 | acetic acid sodium acetate | 300 | potassium dihydrogen phosphate | 120 | A | B | A | A | A | A | B |

TABLE 1-continued

| | Unsaturated aldehyde (B) | | Boron compound | | Conjugated polyene compound | | Acetic acid/acetic acid salt | | Phosphorus compound | | Evaluations | | | | | | |
|---|---|---|---|---|---|---|---|---|---|---|---|---|---|---|---|---|---|
| | | | | | | | | | | | Long-run workability | | Film appearance | | Appearance of solution | | Motor torque |
| | type | content (ppm) | type | content (ppm) | type | content (ppm) | type | content (ppm) | type | content (ppm) | after 8 hrs | after 15 hrs | streak | coloring | transparency | coloring | fluctuation |
| Example 11 | crotonaldehyde | 0.3 | boric acid | 800 | potassium sorbate | 200 | acetic acid sodium acetate | 300 | potassium dihydrogen phosphate | 120 | A | A | A | A | A | A | A |
| Example 12 | crotonaldehyde | 0.3 | boric acid | 800 | sorbic acid | 200 | acetic acid sodium acetate | 5 | potassium dihydrogen phosphate | 120 | A | A | A | B | A | B | B |
| Example 13 | crotonaldehyde | 0.3 | boric acid | 800 | sorbic acid | 200 | acetic acid sodium acetate | 3000 | potassium dihydrogen phosphate | 120 | A | A | B | A | A | B | B |
| Example 14 | crotonaldehyde | 0.3 | boric acid | 800 | sorbic acid | 200 | acetic acid sodium acetate | 300 | potassium dihydrogen phosphate | 0.5 | B | B | A | A | A | B | B |
| Example 15 | crotonaldehyde | 0.3 | boric acid | 800 | sorbic acid | 200 | acetic acid sodium acetate | 300 | potassium dihydrogen phosphate | 500 | B | B | B | A | A | A | B |
| Example 16 | crotonaldehyde | 0.3 | boric acid | 800 | sorbic acid | 200 | acetic acid sodium acetate | 300 | potassium dihydrogen phosphate | 120 | A | A | A | A | A | A | A |
| Example 17 | crotonaldehyde | 0.08 | boric acid | 800 | sorbic acid | 200 | acetic acid sodium acetate | 300 | potassium dihydrogen phosphate | 120 | A | B | B | A | A | A | B |

TABLE 2

| | Unsaturated aldehyde (B) | | Boron compound | | Conjugated polyene compound | | Acetic acid/acetic acid salt | | Phosphorus compound | | Evaluations | | | | | | | |
|---|---|---|---|---|---|---|---|---|---|---|---|---|---|---|---|---|---|---|
| | | | | | | | | | | | Long-run workability | | Film appearance | | Appearance of solution | | Motor torque |
| | type | content (ppm) | type | content (ppm) | type | content (ppm) | type | content (ppm) | type | content (ppm) | after 8 hrs | after 15 hrs | streak | coloring | transparency | coloring | fluctuation |
| Example 18 | crotonaldehyde | 90 | boric acid | 800 | sorbic acid | 50 | acetic acid sodium acetate | 300 | potassium dihydrogen phosphate | 120 | A | A | A | B | A | B | A |
| Example 19 | 2,4-hexadienal | 0.3 | boric acid | 800 | sorbic acid | 200 | acetic acid sodium acetate | 1500 | potassium dihydrogen phosphate | 120 | A | B | B | B | A | B | B |
| Example 20 | 2,4,6-octatrienal | 0.3 | boric acid | 800 | sorbic acid | 200 | acetic acid sodium acetate | 300 | potassium dihydrogen phosphate | 300 | A | B | B | B | A | B | B |
| Example 21 | crotonaldehyde | 0.3 | boric acid | 200 | sorbic acid | 200 | acetic acid sodium acetate | 1200 | potassium dihydrogen phosphate | 120 | A | A | B | A | A | B | B |
| Example 22 | crotonaldehyde | 0.3 | boric acid | 2500 | sorbic acid | 200 | acetic acid sodium acetate | 1200 | potassium dihydrogen phosphate | 120 | A | A | B | A | A | B | B |
| Example 23 | crotonaldehyde | 0.3 | boric acid | 6000 | sorbic acid | 200 | acetic acid sodium acetate | 300 | potassium dihydrogen phosphate | 120 | B | B | B | A | B | A | B |
| Example 24 | crotonaldehyde | 0.3 | boric acid | 800 | myrcene | 200 | acetic acid sodium acetate | 300 | potassium dihydrogen phosphate | 300 | A | B | B | B | A | B | B |
| Example 25 | crotonaldehyde | 0.3 | boric acid | 800 | sorbic acid | 200 | acetic acid sodium acetate | 0 | potassium dihydrogen phosphate | 120 | A | B | B | B | A | B | B |
| Example 26 | crotonaldehyde | 0.3 | boric acid | 800 | sorbic acid | 200 | acetic acid sodium acetate | 300 | potassium dihydrogen phosphate | 0 | B | B | B | B | A | B | B |
| Example 27 | crotonaldehyde | 0.08 | boric acid | 800 | sorbic acid | 1200 | acetic acid sodium acetate | 300 | potassium dihydrogen phosphate | 120 | A | B | B | A | A | B | A |

TABLE 2-continued

| | Unsaturated aldehyde (B) | | Boron compound | | Conjugated polyene compound | | Acetic acid/acetic acid salt | | Phosphorus compound | | Evaluations | | | | | | | |
|---|---|---|---|---|---|---|---|---|---|---|---|---|---|---|---|---|---|---|
| | | | | | | | | | | | Long-run workability | | Film appearance | | Appearance of solution | | | Motor torque |
| | type | content (ppm) | type | content (ppm) | type | content (ppm) | type | content (ppm) | type | content (ppm) | after 8 hrs | after 15 hrs | streak | coloring | transparency | coloring | | fluctuation |
| Comparative Example 1 | crotonaldehyde | 0.01 | boric acid | 800 | sorbic acid | 200 | acetic acid sodium acetate | 300 | potassium dihydrogen phosphate | 300 | B | C | C | B | B | B | | B |
| Comparative Example 2 | crotonaldehyde | 95 | boric acid | 800 | sorbic acid | 200 | acetic acid sodium acetate | 300 | potassium dihydrogen phosphate | 120 | B | C | B | C | B | C | | C |
| Comparative Example 3 | crotonaldehyde | N.D. *1 | boric acid | 800 | sorbic acid | 200 | acetic acid sodium acetate | 300 | potassium dihydrogen phosphate | 120 | B | C | C | B | B | C | | C |
| Comparative Example 4 | crotonaldehyde | N.D. *1 | boric acid | 800 | sorbic acid | 0.01 | acetic acid sodium acetate | 300 | potassium dihydrogen phosphate | 120 | B | C | C | B | B | C | | C |
| Comparative Example 5 | — | N.D. *1 | boric acid | 6000 | sorbic acid | 0.01 | acetic acid sodium acetate | 3000 | potassium dihydrogen phosphate | 500 | C | C | C | C | C | C | | C |
| Comparative Example 6 | crotonaldehyde | N.D. *1 | boric acid | 800 | sorbic acid | 200 | acetic acid sodium acetate | 1500 | potassium dihydrogen phosphate | 300 | B | C | C | C | C | C | | C |
| Comparative Example 7 | crotonaldehyde | 500 | boric acid | 800 | sorbic acid | 1200 | acetic acid sodium acetate | 300 | potassium dihydrogen phosphate | 120 | C | C | C | C | C | C | | C |

*1 N.D.: not detected, with the detection lower limit of 0.01 ppm

Production of Multilayered Structure

Example 28

Using the following cast film formation equipment for four types, seven-layer coextrusion, a coextrusion film formation test which involves the resin composition layer according to the embodiment of the present invention was carried out.

extruder (1): single screw, screw diameter 65 mm, L/D=22, for polyolefin of outer layer extruder (2): single screw, screw diameter 40 mm, L/D=26, for polyolefin extruder (3): single screw, screw diameter 40 mm, L/D=22, for adhesive resin extruder (4): single screw, screw diameter 40 mm, L/D=26, for EVOH Polypropylene (hereinafter, may be abbreviated as "PP") was fed into the extruder (1) and the extruder (2), a maleic anhydride-modified polypropylene adhesive resin (ADMER QF-500 (trade name), manufactured by Mitsui Chemicals, Inc.) was fed into the extruder (3), and the resin composition obtained in Example 1 was fed into the extruder (4) to execute coextrusion film formation. The extrusion temperature setting was: 200 to 250° C. for the extruder (1); 200 to 250° C. for the extruder (2); 160 to 250° C. for the extruder (3); and 170 to 250° C. for the extruder (4), and the temperature setting of the feed block and the die was 250° C. With respect to the constitutive structure and the thickness of the formed multilayer film, the target constitutive structure having seven layers of four types, i.e., PP/PP/adhesive resin/EVOH/adhesive resin/PP/PP=30/15/2.5/5/2.5/15/30 μm had a total thickness of 100 μm.

The sheet was sampled 10 hrs after starting the film formation, and the appearance was observed. Consequently, an unfavorable appearance resulting from the aggregation of EVOH, and flow marks resulting from abnormal flow were scarcely found. Accordingly, a practically applicable multilayer film was obtained.

Comparative Example 8

In a similar manner to Example except that the resin composition of Example was replaced with the resin composition obtained in Comparative Example 6, the sheet was sampled 10 hrs after starting the film formation, and the appearance was observed. Consequently, a multilayer film having an unfavorable appearance resulting from the aggregation of EVOH, and many flow marks resulting from abnormal flow was obtained.

As shown in Table 1, the resin composition according to the embodiment of the present invention is less likely to cause generation of streaks, and coloring of the molded articles formed therefrom, and a film that is superior in appearance characteristics was successfully formed. In addition, it was also proven that the resin composition according to the embodiment of the present invention is superior in long-run workability in melt molding.

INDUSTRIAL APPLICABILITY

The resin composition according to the embodiment of the present invention enables occurrences of defects such as fish eyes in melt molding to be suppressed; therefore, appearance characteristics of the molded articles formed therefrom can be also superior. Also, the resin composition is less likely to cause the defects even if melt molding is carried out for a long time period in particular, and also superior long-run workability is attained. Therefore, the resin composition is suitably used as various types of packaging materials by molding to form containers, films, sheets and the like.

The invention claimed is:

1. A resin composition, comprising:
   (A) an ethylene-vinyl alcohol copolymer; and
   (B) an unsaturated aldehyde,
   wherein a content of the unsaturated aldehyde (B) with respect to the resin composition comprising the ethylene-vinyl alcohol copolymer is 0.01 ppm or more and 100 ppm or less.

2. The resin composition according to claim 1, wherein the unsaturated aldehyde (B) is (B-1) an unsaturated aliphatic aldehyde.

3. The resin composition according to claim 2, wherein the unsaturated aldehyde (B) is crotonaldehyde, 2,4-hexadienal, 2,4,6-octatrienal or a combination thereof.

4. The resin composition according to claim 1, further comprising a conjugated polyene compound, wherein a content of the conjugated polyene compound is 0.01 ppm or more and 1,000 ppm or less.

5. The resin composition according to claim 4, wherein the conjugated polyene compound is sorbic acid, a sorbic acid salt or a combination thereof, wherein the resin composition further comprises 100 ppm or more and 5,000 ppm or less of a boron compound.

6. The resin composition according to claim 1, further comprising acetic acid, an acetic acid salt, or both, wherein a content of acetic acid and the acetic acid salt is 50 ppm or more and 1,000 ppm or less.

7. The resin composition according to claim 1, further comprising a phosphorus compound, wherein a content of the phosphorus compound is 1 ppm or more and 200 ppm or less.

8. A multilayered structure comprising at least one or more layers each constituted with the resin composition according to claim 1.

* * * * *

UNITED STATES PATENT AND TRADEMARK OFFICE
CERTIFICATE OF CORRECTION

| | | |
|---|---|---|
| PATENT NO. | : 9,163,131 B2 | Page 1 of 1 |
| APPLICATION NO. | : 14/382459 | |
| DATED | : October 20, 2015 | |
| INVENTOR(S) | : Shogo Nakazawa et al. | |

It is certified that error appears in the above-identified patent and that said Letters Patent is hereby corrected as shown below:

IN THE CLAIMS

Claim 1, beginning at line 26, should read --, wherein the resin composition further comprises 100 ppm or more and 5,000 ppm or less of a boron compound--

Signed and Sealed this
Twenty-ninth Day of March, 2016

Michelle K. Lee
*Director of the United States Patent and Trademark Office*